US010003200B2

(12) United States Patent
Budde

(10) Patent No.: US 10,003,200 B2
(45) Date of Patent: Jun. 19, 2018

(54) DECENTRALIZED MODULE-BASED DC DATA CENTER

(71) Applicant: SCHNEIDER ELECTRIC IT CORPORATION, West Kingston, RI (US)

(72) Inventor: Kristian Budde, Kolding (DK)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 146 days.

(21) Appl. No.: 14/987,023

(22) Filed: Jan. 4, 2016

(65) Prior Publication Data
US 2017/0194791 A1 Jul. 6, 2017

(51) Int. Cl.
| H02J 1/10 | (2006.01) |
| H02J 3/38 | (2006.01) |
| H02J 9/06 | (2006.01) |
| H02M 3/04 | (2006.01) |
| H02M 7/04 | (2006.01) |
| H02M 7/44 | (2006.01) |
| G06F 1/26 | (2006.01) |

(52) U.S. Cl.
CPC .............. *H02J 3/383* (2013.01); *G06F 1/263* (2013.01); *H02J 9/06* (2013.01); *H02M 3/04* (2013.01); *H02M 7/04* (2013.01); *H02M 7/44* (2013.01)

(58) Field of Classification Search
CPC ....... H02J 9/061; H02J 9/062; Y10T 307/615; Y10T 307/625; Y10T 307/62
See application file for complete search history.

(56) References Cited

U.S. PATENT DOCUMENTS

| 4,860,185 A | 8/1989 | Brewer et al. |
| 6,787,259 B2 | 9/2004 | Colborn et al. |
| 8,159,178 B2 | 4/2012 | Serban |
| 8,193,662 B1 | 6/2012 | Carlson et al. |
| 2011/0006607 A1 | 1/2011 | Kwon et al. |
| 2013/0049471 A1 | 2/2013 | Oleynik et al. |
| 2016/0172900 A1* | 6/2016 | Welch, Jr. ............ H05K 7/1492 307/64 |

FOREIGN PATENT DOCUMENTS

| EP | 2071700 A1 | 6/2009 |
| EP | 2475070 A1 | 7/2012 |
| WO | 20150026343 A1 | 2/2015 |
| WO | 20150102598 A1 | 7/2015 |

OTHER PUBLICATIONS

Extended European Search Report from corresponding European Application No. 16206522.1 dated May 31, 2017.

* cited by examiner

Primary Examiner — Sibin Chen
(74) Attorney, Agent, or Firm — Lando & Anastasi, LLP

(57) ABSTRACT

According to one aspect, embodiments of the invention provide a distributed power system comprising a DC bus, at least one DC UPS configured to provide DC power to the DC bus derived from at least one of input AC power and backup DC power such that a DC voltage on the DC bus is maintained at a nominal level, and at least one power module configured to monitor the DC voltage on the DC bus, to convert DC power from an energy storage device into regulated DC power, and to provide the regulated DC power to the DC bus in response to a determination that the DC voltage on the DC bus is less than a threshold level.

15 Claims, 8 Drawing Sheets

DECENTRALIZED MODULE-BASED DC DATA CENTER

BACKGROUND OF INVENTION

Field of Invention

The present invention relates generally to systems and methods for operating a DC data center.

Discussion of Related Art

Centralized data centers for computer, communications and other electronic equipment have been in use for a number of years. Typical centralized data centers contain numerous enclosures or racks of equipment (e.g., servers, network equipment, or other devices) that require power, cooling and connections to communication facilities.

The use of power devices, such as Uninterruptible Power Supplies (UPS), to provide regulated, uninterrupted power for sensitive and/or critical loads in a data center rack, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

Aspects in accord with the present invention are directed to a distributed power system comprising a DC bus configured to be coupled to at least one first external DC load, at least one DC UPS having a first input configured to be coupled to an AC power source and to receive input AC power from the AC power source, a second input configured to be coupled to a backup power source and to receive backup DC power from the backup power source, and an output configured to be coupled to the DC bus, the at least one DC UPS configured to provide DC power to the DC bus derived from at least one of the input AC power and the backup DC power such that a DC voltage on the DC bus is maintained at a nominal level, and at least one power module configured to be coupled to an energy storage device and to the DC bus, to monitor the DC voltage on the DC bus, to convert DC power from the energy storage device into regulated DC power, and to provide the regulated DC power to the DC bus in response to a determination that the DC voltage on the DC bus is less than a threshold level.

According to one embodiment, the distributed power system further comprises a DC/DC converter configured to be coupled to a renewable energy power source, to receive DC power from the renewable energy power source, to convert the DC power from the renewable energy power source into regulated DC power, and to provide the regulated DC power derived from the renewable energy power source to the DC bus to maintain the DC voltage on the DC bus at the nominal level. In another embodiment, the distributed power system further comprises at least one DC/AC converter configured to be coupled to the DC bus and at least one AC load, to convert DC power from the DC bus into regulated AC power, and to provide the regulated AC power to the at least one AC load.

According to another embodiment, in response to a determination that the DC voltage on the DC bus is greater than the threshold level, the at least one power module is further configured to convert DC power from the DC bus into regulated DC power, and to provide the regulated DC power to the energy storage device to charge the energy storage device. In one embodiment, the at least one power module includes a first power module configured to be coupled to a first type of energy storage device and to the DC bus, to monitor the DC voltage on the DC bus, to convert DC power from the first type of energy storage device into regulated DC power, and to provide the regulated DC power to the DC bus in response to a determination that the DC voltage on the DC bus is less than a first threshold level, and a second power module configured to be coupled to a second type of energy storage device and to the DC bus, to monitor the DC voltage on the DC bus, to convert DC power from the second type of energy storage device into regulated DC power, and to provide the regulated DC power to the DC bus in response to a determination that the DC voltage on the DC bus is less than a second threshold level.

According to one embodiment, the first threshold level is greater than the second threshold level. In another embodiment, the first type of energy storage device is a fast discharge type of energy storage device, and wherein the second type of energy storage device is a slow discharge type of energy storage device. In one embodiment, the first energy storage device is one of a capacitor and a flywheel. In another embodiment, the second energy storage device is one of a battery and a fuel cell.

According to another embodiment, the at least one power module is configured to operate absent communication with the at least one DC UPS. In one embodiment, the distributed power system further comprises a DC/DC converter configured to be coupled to a second external DC load, to receive DC power from the DC bus, to convert the DC power from the DC bus into regulated DC power, and to provide the regulated DC power derived from the DC bus to the second external DC load.

Another aspect in accord with the present invention is directed to a method for controlling a DC data center, the method comprising acts of receiving, by at least one DC UPS, input AC power from an AC power source, receiving, by the at least one DC UPS, backup DC power from a backup power source, providing, by the at least one DC UPS, DC power to a DC bus derived from at least one of the input AC power and the backup DC power such that a DC voltage on the DC bus is maintained at a nominal level, monitoring, by at least one power module coupled to at least one energy storage device, the DC voltage on the DC bus, converting, by the at least one power module in response to a determination that the DC voltage on the DC bus is less than a threshold level, DC power from the at least one energy storage device into regulated DC power, and providing, by the at least one power module, the regulated DC power to the DC bus.

According to one embodiment, the method further comprises acts of converting, by the at least one power module in response to a determination that the DC voltage on the DC bus is greater than the threshold level, DC power from the DC bus into regulated DC power, and providing, by the at least one power module, the regulated DC power to the energy storage device to charge the energy storage device. In one embodiment, monitoring by the at least one power module includes monitoring, by a first power module coupled to a first type of energy storage device and a second power module coupled to a second type of energy storage device, the DC voltage on the DC bus; converting includes converting, by the first power module in response to a determination that the DC voltage on the DC bus is less than a first threshold level, DC power from the first type of energy storage device into first regulated DC power and converting, by the second power module in response to a determination that the DC voltage on the DC bus is less than a second threshold level, DC power from the second type of energy storage device into second regulated DC power, and providing includes providing, by the first power module, the first regulated DC power to the DC bus in response to a determination that the DC voltage on the DC bus is less than the first threshold level and providing, by the second power module, the second regulated DC power to the DC bus in response to a determination that the DC voltage on the DC bus is less than the second threshold level.

According to another embodiment, the method further comprises acts of converting, with at least one DC/AC converter coupled to the DC bus and at least one AC load, DC power from the DC bus into regulated AC power, and providing the regulated AC power to the at least one AC load. In one embodiment, the method further comprises acts of converting, with at least one DC/DC converter coupled to the DC bus and a renewable energy source, DC power from the renewable energy source into regulated DC power, and providing the regulated DC power derived from the renewable energy power source to the DC bus to maintain the DC voltage on the DC bus at the threshold level.

According to one embodiment, the method further comprises acts of converting, with at least one DC/DC converter coupled to the DC bus and at least one external DC load, DC power from the DC bus into regulated DC power, and providing the regulated DC power derived from the DC bus to the at least one external DC load. In one embodiment, the method further comprises an act of providing DC power from the DC bus to at least one external DC load. In at least one embodiment, the acts of providing, by the at least one DC UPS, DC power to a DC bus, monitoring the DC voltage on the DC bus, converting, by the at least one power module, DC power from the at least one energy storage device into regulated DC power, and providing the regulated DC power to the DC bus, are performed absent communication between the at least one DC UPS and the at least one power module.

At least one aspect in accord with the present invention is directed to a distributed power system comprising a DC bus configured to be coupled to at least one external DC load, at least one DC UPS having a first input configured to be coupled to an AC power source and to receive input AC power from the AC power source, a second input configured to be coupled to a backup power source and to receive backup DC power from the backup power source, and an output configured to be coupled to the DC bus, the at least one DC UPS configured to provide DC power to the DC bus derived from at least one of the input AC power and the backup DC power, at least one power module configured to be coupled to an energy storage device and to the DC bus and to provide regulated DC power to the DC bus derived from the energy storage device, and means for maintaining a DC voltage on the DC bus at a desired level during a grid-fault condition of the at least one DC UPS absent communication between the at least one DC UPS and the at least one power module.

BRIEF DESCRIPTION OF THE DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
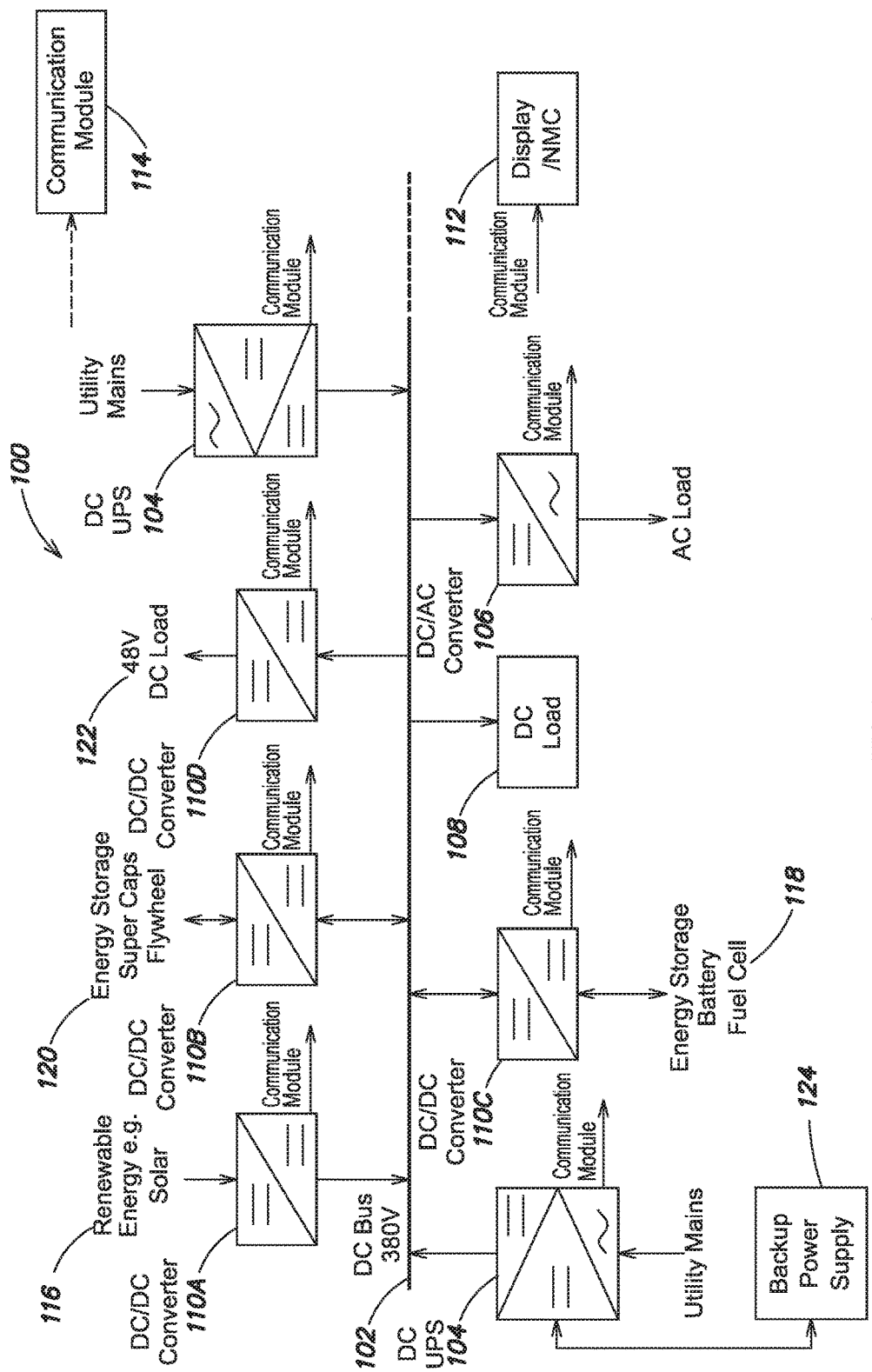
FIG. 1 is a block diagram of a decentralized module-based DC data center in accordance with aspects of the present invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, UPS's are commonly used to provide AC power to sensitive and/or critical loads in a data center. Such UPS systems are typically either standalone units supplying power to data center equipment or are coupled in parallel to provide enhanced power and/or redundancy.

A decentralized module-based DC data center is provided that includes at least one DC UPS system configured to convert AC power from an AC power source into DC power and provide the DC power to loads in the DC data center via a DC bus. The DC UPS systems of the decentralized module-based DC data center provide benefits that cannot typically be realized by AC UPS systems. In addition to generally being more efficient than AC UPS systems, the DC UPS systems can support the modular addition of additional DC components (e.g., energy storage devices or other energy sources) to the data center without requiring load balancing between phases. According to at least one embodiment, as it is not necessary for the DC UPS systems or DC components to account for the phase information of other components in the data center, the DC UPS systems and DC components can also provide full functionality even when communication between components is interrupted or missing.

FIG. 1 is a block diagram of a distributed power system 100 according to aspects described herein. The distributed power system 100 includes a DC bus 102, a DC UPS 104, a DC/AC converter 106, a first DC/DC converter 110A, a second DC/DC converter 110B, a third DC/DC converter 110C, and a fourth DC/DC converter 110D.

The DC UPS 104 is coupled to the DC bus 102 via a DC interface and is configured to be coupled to an AC utility source (e.g., mains) via an AC interface. The DC/AC converter 106 is coupled to the DC bus 102 via a DC interface and is configured to be coupled to an AC-powered load via an AC interface. Each of the DC/DC converters 110A-110D is coupled to the DC bus 102 via a first DC interface. According to at least one embodiment, at least one DC load 108 can also be coupled to the DC bus 102.

According to one embodiment, the DC loads 108 are servers or other types of data center equipment within a single data center rack and the DC bus 102 is coupled to the loads 108 within the rack. In another embodiment, the DC loads 108 are servers or other types of data center equipment across multiple data center racks and the DC bus 102 is coupled between the multiple data center racks and to each load 108. In other embodiments, the DC bus 102 is coupled to any number and/or type of loads 108 included within any number of different data center racks or other types of DC modules.

As shown in FIG. 1, each of the DC/DC converters 110A-110D is also configured to be coupled to at least one of a load, an energy source, and/or an energy storage device via a second DC interface. For example, the second DC interface of the first DC/DC converter 110A is coupled to an energy source 116. In one embodiment, the energy source 116 is a renewable energy source (e.g., a solar energy power source, a hydroelectric power energy source, etc.); however, in other embodiments the energy source 116 may be some other type of renewable or non-renewable energy source.

The second DC interface of the second DC/DC converter 110B is coupled to an energy storage device 120. In one embodiment, the energy storage device 120 is a "fast" energy storage device (i.e., an energy storage device such as a super capacitor, flywheel, etc., that discharges stored energy quickly relative to other storage devices); however, in other embodiments, the energy storage device 120 may be some other type of energy storage device. The second DC interface of the third DC/DC converter 110C is coupled to an energy storage device 118. In one embodiment, the energy storage device 118 is a "slow" energy storage device (e.g., an energy storage device such as a battery, fuel cell, etc., that discharges stored energy slowly relative to other storage devices); however, in other embodiments, the energy storage device 118 may be some other type of energy storage device. The second DC interface of the fourth DC/DC converter 110D is coupled to a DC load 122.

The DC UPS 104, the DC/AC converter 106, and the DC/DC converters 110A-110D are each capable of drawing and/or supplying power to the DC bus 102 under certain operating conditions. For example, in one embodiment, the DC UPS 104 includes an AC/DC converter and is configured to draw AC power from the AC utility source, convert the AC power to DC power at a desired level (with the AC/DC converter), and provide the converted DC power to the DC bus 102. The DC UPS 104 may also include a backup power source 124 (e.g., a battery) and, in response to the failure of the AC utility source, the DC UPS 104 may convert DC power from the backup power source 124 into DC power at a desired level and provide the converted DC power to the DC bus 102. The DC/AC converter 106 is configured to draw DC power from the DC bus 102, convert the DC power to AC power, and provide the converted AC power to the AC load.

The DC/DC converters 110A-D are operable to draw power from, or supply power to, the DC bus 102 based on different operating conditions and the type of device coupled to the second DC interface of the DC/DC converter 110A-D. For example, the first DC/DC converter 110A is operable to receive DC power from the renewable energy source 116, convert the DC power into DC power at a desired level, and provide the regulated DC power to the DC bus 102. The second DC/DC converter 110B is operable to receive DC power from the "fast" energy storage device 120, convert the DC power into DC power at a desired level, and provide the regulated DC power to the DC bus 102. The second DC/DC converter 110B is also operable to receive DC power from the DC bus 102, convert the DC power into DC power at a desired level, and provide the regulated DC power to the "fast" energy storage device 120 to recharge the device 120. The third DC/DC converter 110C is operable to receive DC power from the "slow" energy storage device 118, convert the DC power into DC power at a desired level, and provide the regulated DC power to the DC bus 102. The third DC/DC converter 110C is also operable to receive DC power from the DC bus 102, convert the DC power into DC power at a desired level, and provide the regulated DC power to the "slow" energy storage device 118 to recharge the device 118. The fourth DC/DC converter 110D is operable to receive DC power from the DC bus 102, convert the DC power into DC power at a desired level, and provide the regulated DC power to the DC load 122.

According to at least one embodiment, the DC/DC converters 110A-110D are also operable to not draw power from, or supply power to, the DC bus 102 under an idle condition. The DC load 108 is a load operating at a DC voltage substantially the same as the voltage on the DC bus 102. Accordingly, it is connected directly to the DC bus 102, and is operable to draw power directly from the DC bus 102.

Although FIG. 1 shows each of the DC/DC converters 110A-D connected to a specific DC source, load, or energy storage device, no such specific connections are required. Any combination of the foregoing DC sources, loads and/or energy storage devices connected to the DC/DC converters 110A-D is possible. The illustrated embodiment is representative only of some of the various possible connections of the system 100.

The DC UPS 104 and the DC/DC converters 110A-110D operate to maintain a desired voltage on the DC bus 102 (i.e., a voltage sufficient to power any DC loads 108 coupled to the DC bus 102). For example, in a normal mode of operation, the DC UPS 104 provides DC power (derived either from the AC utility source or the backup power source 124 coupled to the DC UPS 104) to the DC bus 102 and the first DC/DC converter 110A provides DC power (derived from the renewable energy source 116) to the DC bus 102. The DC UPS 104 and the first DC/DC converter 110A operate to maintain a desired voltage on the DC bus 102. If the DC UPS 104 is unable to provide the necessary DC power to the DC bus 102 (e.g., because of a failure of the AC utility source or because the charge on the backup power source 124 is too low), at least one of the DC/DC converters 110B-110C operates to make up for any deficiency of the DC UPS 104. For example, in response to a drop in the voltage on the DC bus 102 (e.g., due to a failure of the DC UPS 104), at least one of the DC/DC converters 110B-110C may operate to provide DC power, derived from a corresponding energy source or energy storage device, to the DC bus 102 to bring the voltage level on the DC bus 102 back up to the desired level.

According to one embodiment, the DC UPS 104, the DC/AC converter 106, and the DC/DC converters 110A-D are configured to communicate. For example, in at least one embodiment, the distributed power system 100 includes a communication module 114 that is communicatively coupled to the DC UPS 104, the DC/AC converter 106, and the DC/DC converters 110A-D and is configured to facilitate communication between the different components of the system 100. The communication module 114 is operable to send and receive status information (e.g., whether an energy storage device is charging or discharging as intended, whether an energy source is currently providing power, whether a grid fault situation has occurred, etc.) to and from the various components of the system 100. By allowing communication between the different components of the system 100, the components of the system 100 can work together, based on the information sent and received by each component, to maintain the desired voltage on the DC bus 102.

According to one embodiment, the system 100 further includes a display 112. In one embodiment, the display 112 includes a Network Management Card (NMC) that allows the display 112 to communicate with the communication module 114 and receive status information regarding the various components of the system 100. Based on the status information received from the communication module 114, the display 112 provides a user interface operable to allow an operator of the distributed power system 100 to monitor and manage installation of the installed components. The display 112 is configured to display information about the status of each of the installed components. The operator can also use the display 112 to specify certain information or instructions to the installed components, such as, for example, a sequence of prioritized discharge when several stored energy sources are connected to the system, as illustrated in the exemplary discharge process shown in FIGS. 2-6.

According to another embodiment, where the system 100 does not include the communication module 114 or at least one communication link between one of the components and the communication module 114 has failed or been interrupted, the components of the system 100 are not able to communicate directly. In such an embodiment, each component (i.e., each of the DC UPS 104, DC/AC converter 106, and DC/DC converters 110A-D) within the system independently monitors the DC bus 102, and based on the monitoring of the DC bus 102, determines whether each respective component should be providing power to the DC bus 102 or drawing power from the DC bus 102. As discussed above, such independent operation of the components of the system 100 is possible because the DC components need not account for the phase information of the other components in the system.

Figure 2:
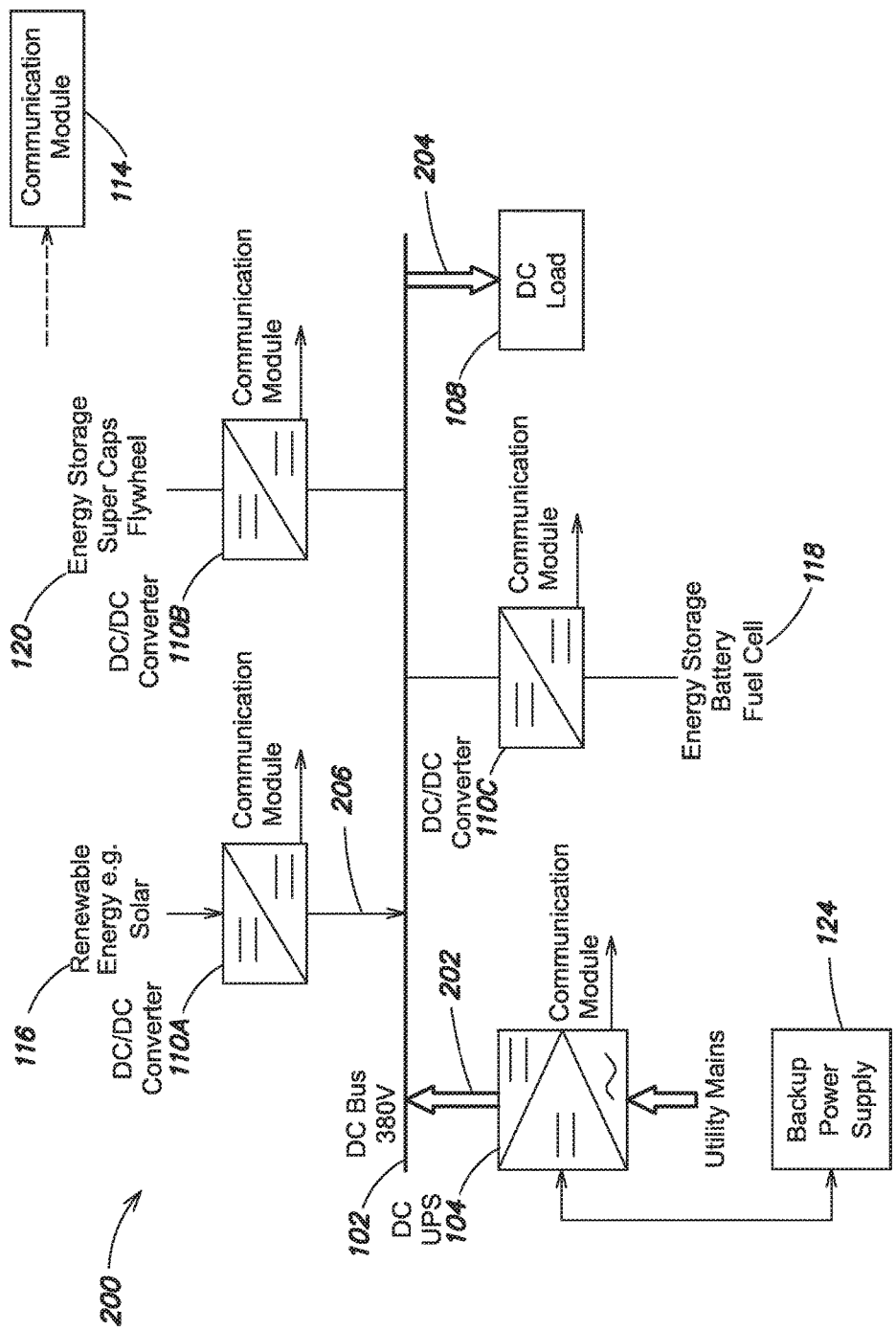
FIG. 2 is a block diagram of a decentralized module-based DC data center during normal operating conditions according to one embodiment.

FIG. 2 is a block diagram illustrating a portion 200 of the distributed power system 100 under normal operating conditions. As shown in FIG. 2, under normal operating conditions, AC power is drawn from an AC utility source by the DC UPS 104, converted into DC power at a desired level, and delivered to the DC bus 102, as indicated by arrow 202. Also under normal operating conditions, DC power from the renewable energy source 116 is received by the first DC/DC converter 110A, converted into DC power at a desired level, and delivered to the DC bus 102, as indicated by arrow 206. The DC UPS 104 and first DC/DC converter 110A work together to maintain a desired DC voltage on the DC bus 102. In the illustrated embodiment, a DC load 108 is connected to the DC bus 102, and the DC load 108 draws power from the DC bus 102 as illustrated by an arrow 204. Operation of the system 100 shown in FIG. 2 is discussed in greater detail below with respect to FIG. 3.

Figure 3:
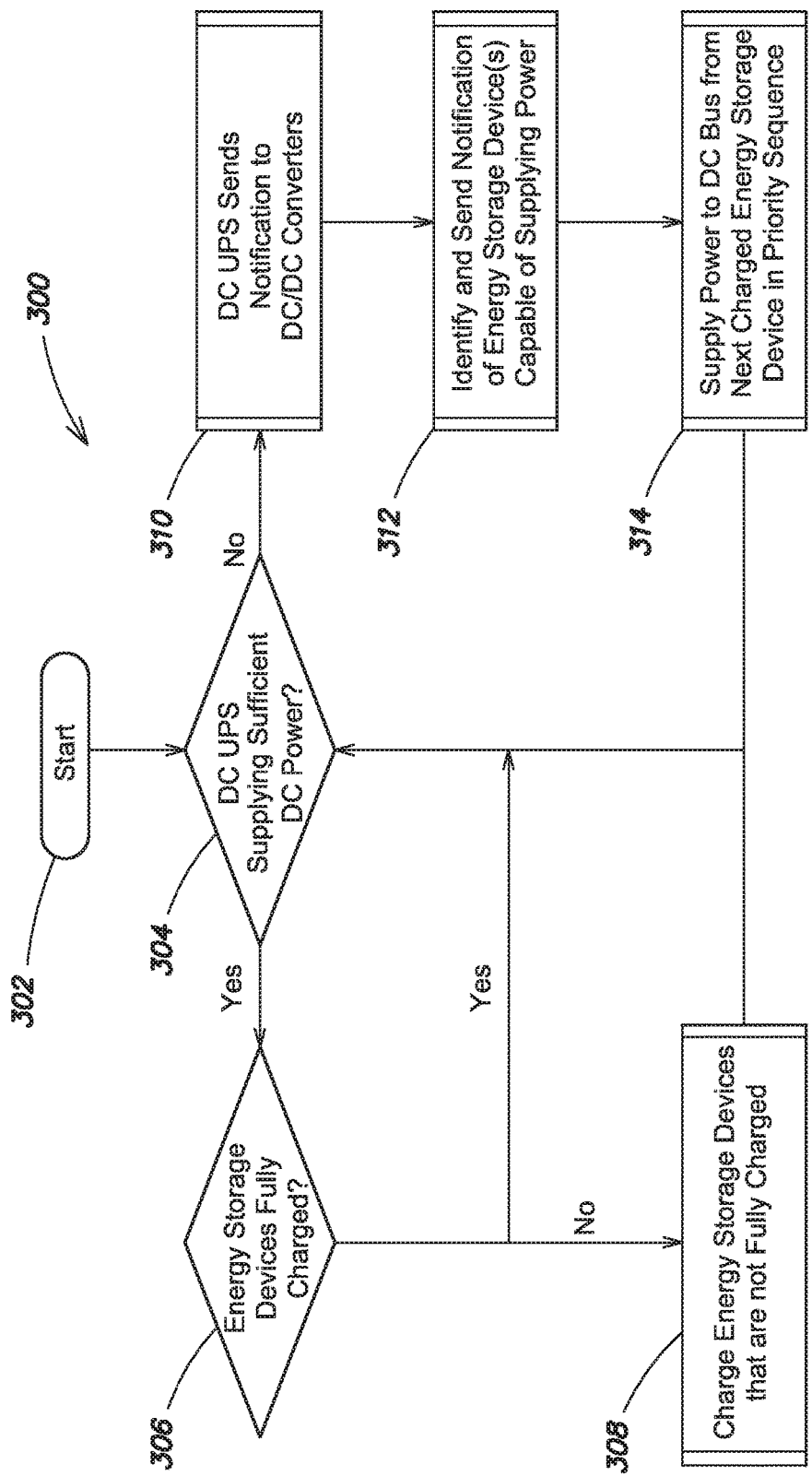
FIG. 3 is a process flow diagram illustrating a process for operating a DC/DC converter module according to one embodiment.

FIG. 3 is a flow chart of a process 300 for operating the power system 100 according to at least one embodiment described herein. At block 302, the DC UPS 104 operates to provide DC power (derived from an AC utility source or from a backup power source 124) to the DC bus 102, and the first DC/DC converter 110A operates to provide DC power (derived from DC power supplied by the renewable energy source 116) to the DC bus 102. The DC UPS 104 and the first DC/DC converter 110A exchange status information (e.g., DC output power related information) via the communication module 114 and work together, based on the exchanged information, to maintain a desired DC voltage on the DC bus 102. The desired DC voltage level is at a level sufficient to power any DC loads 108 coupled to the DC bus 102, any AC loads coupled to the DC bus 102 via the DC/AC converter 106 and/or any DC loads coupled to the DC bus 102 via the fourth DC/DC converter 110D.

At block 304, a determination is made whether the DC UPS 104 (in combination with the first DC/DC converter 110A) is capable of providing sufficient DC power to the DC bus 102 such that the DC voltage on the DC bus 102 can be maintained at a desired level. For example, according to one embodiment where the components of the system 100 are operable to communicate via the communication module 114, the DC UPS 104 monitors the power received from the AC utility power supply and/or the charge level of the backup power source 124. In response to a determination that the DC UPS 104 is capable of providing sufficient DC power to the DC bus 102, the DC UPS 104 informs the other components of the system 100, via the communication module 114, that necessary power is being provided to the DC bus 102.

At block 306, in response to receiving the notification from the DC UPS 104 that the DC UPS 104 is providing the necessary power to the DC bus 102, the DC/DC converters 110B-C (i.e., the DC/DC converters coupled to energy storage devices 118, 120) determine whether each corresponding energy storage device 118, 120 is fully charged. At block 308, in response to a determination that an energy storage device 118, 120 is not fully charged, the DC/DC converter 110B-C corresponding to the not-fully-charged energy storage device 118, 120 operates to draw DC power from the DC bus 102, convert the DC power into DC power at an appropriate charging level, and provide the converted DC power to the energy storage device 118, 120 to charge the energy storage device 118, 120. The DC/DC converters 110B-C may also provide information (e.g., the level of DC power drawn from the bus 102) to the DC UPS 104 such that the DC UPS 104 can operate to maintain the desired voltage level on the DC bus 102 despite the draw of DC power by the DC/DC converters 110B-C from the DC bus 102. Once charging has begun, or if all of the energy storage devices are fully charged, the process 300 returns to block 304.

At block 310, in response to a determination that the DC UPS 104 is not providing the necessary power to the DC bus 102 (e.g., because the power from the AC utility power supply is interrupted or the charge on the backup power source 124 is inadequate), the DC UPS 104 sends a notification to each DC/DC converter 110B-C connected to an energy storage device 118, 120 via the communication module 114 that the DC UPS 104 is unable to supply the necessary DC power to the DC bus 102.

At block 312, an evaluation is made by each of the DC/DC converters 110B-C to identify whether the respective energy storage device 118, 120 connected thereto is capable of supplying the necessary power to the DC bus 102 to maintain the voltage on the DC bus 102 at the desired level (e.g., whether the corresponding energy storage device has enough stored energy to supply the necessary power to the DC bus 102). Each respective DC/DC converter sends results of the evaluation to each of the other DC/DC converters.

At block 314, in response to the results of the evaluation generated at block 312 (i.e., whether each of the DC/DC converters 110B-C is capable of supplying power to the DC bus 102), each DC/DC converter 110B-C connected to a charged energy storage device determines whether the respective energy storage device connected thereto is next in a priority sequence. According to at least one embodiment, the priority sequence specifies that "fast" energy storage devices should be discharged before "slow" energy storage devices. In an alternate embodiment, the priority sequence specifies that "slow" energy storage devices should be discharged before "fast" energy storage devices. According to other embodiments, the priority sequence may be defined in some other appropriate way. According to one embodiment, the priority sequence is automatically determined by the system 100, while in others, the priority sequence is predefined by a user.

By communicating with the other components of the system 100 via the communication module 114, each component is aware of the existence and type of other components that are coupled to the DC bus 102, and as such, each component can determine whether, in light of the priority sequence, the component should provide power to the DC bus 102. In response to a determination that a DC/DC converter 110B-C is connected to an energy storage device that is not next in the priority sequence, the DC/DC converter 110B-C does not provide DC power to the DC bus 102 (and either remains idle or continues to draw power from the DC bus 102). Otherwise, in response to a determination that a DC/DC converter 110B-C is connected to a charged energy storage device that is next in the priority sequence, the respective DC/DC converter operates to supply the necessary power to the DC bus 102 to maintain the voltage across the DC bus 102 at the desired level. The process 300 returns to block 304 from block 314.

Returning to FIG. 2, the DC/DC converters 110B-C are operable to execute process 300. As previously mentioned, in FIG. 2, the DC UPS 104 is supplying sufficient power (in combination with the first DC/DC converter 110A) to the DC bus 102 from the AC utility supply (304 YES), and each of a fast energy storage device 120 connected to DC/DC converter 110B and a slow energy storage device 118 connected to the third DC/DC converter 110C are fully charged (306 YES). Accordingly, the DC/DC converters 110B-C do not supply power to, or draw power from, the DC bus 102.

Figure 4:
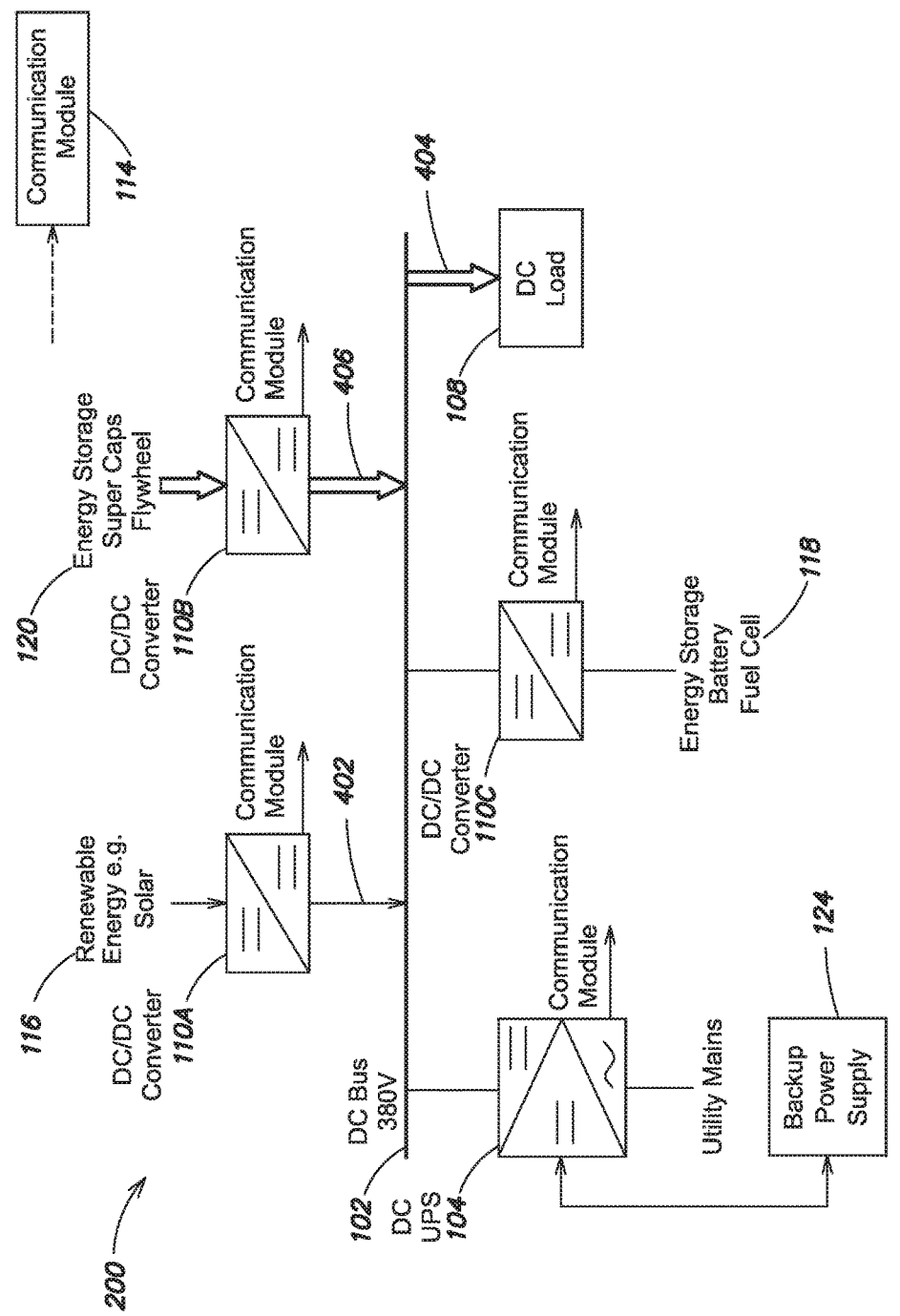
FIG. 4 is a block diagram of a decentralized module-based DC data center during a grid fault condition according to one embodiment.

FIG. 4 is a block diagram illustrating the portion 200 of the power distribution system 100 under a grid fault condition. In one embodiment, a grid fault condition exists when the AC utility source providing AC power to the DC UPS 104 has failed and the backup power source 124 coupled to the DC UPS 104 is unavailable or insufficient to maintain the voltage on the DC bus 102 at the desired level. As a result, during a grid fault condition, the DC UPS 104 is not capable of providing necessary DC power to the DC bus 102 to maintain (in combination with the first DC/DC converter 110A) the voltage on the DC bus 102 at the desired level. As shown in FIG. 4, during a grid fault condition when the DC UPS 104 is not capable of supplying sufficient power to the DC bus 102 (304 NO), DC power is provided to the DC bus 102 by the first DC/DC converter 110A (e.g., shown as arrow 402) and by the second DC/DC converter 110B (e.g., shown as arrow 406). In the illustrated embodiment, the DC load 108 continues to draw DC power from the DC bus 102 during the grid fault condition (e.g., shown as arrow 404).

More specifically, as described above with respect to FIG. 3, in response to a determination that the DC UPS 104 cannot provide the necessary power to the DC bus 102, at block 310 the DC UPS 104 sends a notification to each DC/DC converter 110B-C connected to an energy storage device 118, 120 via the communication module 114 that the DC UPS 104 is unable to supply the necessary DC power to the DC bus 102. In the embodiment shown in FIG. 4, both the fast energy storage device 120 and the slow energy storage device 118 are fully charged immediately before the grid fault condition. As such, at block 312, in response to receiving the notification from the DC UPS 104, both the fast 120 and slow energy storage device 118 are identified as being capable of supplying energy to the DC bus 102.

In an embodiment where the priority sequence specifies that fast energy storage devices should be discharged before slow energy storage devices, at block 314, the second DC/DC converter 110B connected to the fast energy storage device 120 operates to supply power to the DC bus 102 derived from the fast energy storage device 120 as indicated by arrow 406, while the third DC/DC converter 110C connected to the slow energy storage device 118 remains in an idle state (i.e., the third DC/DC converter 110C does not draw power from the DC bus 102 or supply power to the DC bus 102).

According to one embodiment, the DC power from the fast energy storage device 120 is sufficient to maintain the voltage on the DC bus 102 at the desired level until the DC UPS 104 is once again able to provide necessary DC power to the DC bus 102. For example, if the downtime of the AC power is relatively short, energy from the fast energy storage device 120 can respond quickly to adequately maintain the voltage on the DC bus 102 at the desired level until the DC UPS 104 again provides the necessary power to the DC bus 102. At block 304, once the DC UPS 104 determines that the DC UPS 104 is once again able to provide the necessary power to the DC bus 102 (in combination with the first DC/DC converter 110A) to maintain the voltage on the DC bus 102 at the desired level, the DC UPS 104 transmits a notification to each component of the system 100 that the DC UPS 104 is providing the necessary power to the DC bus 102 and the process 300 returns to block 306.

However, according to one embodiment, the downtime of the AC power may be too long for the fast energy storage device 120 to adequately maintain the voltage on the DC bus 102 at the desired level. For example, the fast energy storage device 120 may be completely discharged before the DC UPS 104 is able to provide the necessary DC power to the DC bus 102. In such an embodiment, at block 312 the second DC/DC converter 110B sends a notification to the other components of the system 100 that the corresponding fast energy storage device 120 is not able to provide DC power to the DC bus 102. Based on the defined priority sequence and in response to receiving such a notification from the second DC/DC converter 110B, at block 314, the third DC/DC converter 110C may determine that the corresponding slow energy storage device 118 is next in the priority sequence and operate to provide DC power to the DC bus 102 derived from the slow energy storage device 118.

Figure 5:
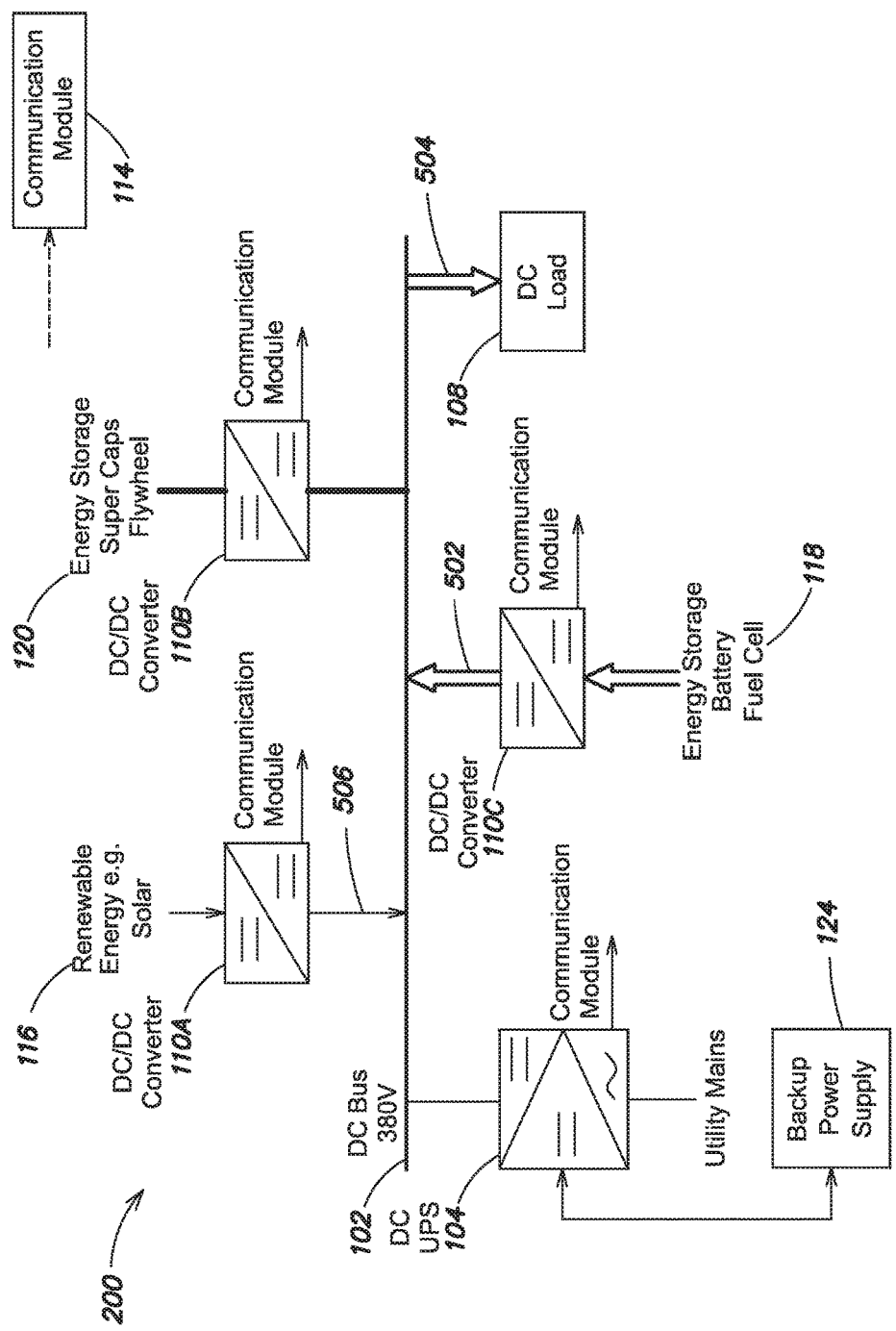
FIG. 5 is a block diagram of a decentralized module-based DC data center during a grid fault condition according to one embodiment.

For example, FIG. 5 is a block diagram of the portion 200 of the power distribution system 100 during a grid fault condition in which DC power is provided to the DC bus 102 by the first DC/DC converter 110A (e.g., shown as arrow 506) and the third DC/DC converter 110C (e.g., shown as arrow 502). As described above, under the grid fault condition, the DC UPS 104 is incapable of supplying power to the DC bus 102 (304 NO). The DC UPS 104 communicates status information to the DC/DC converters 110B-C at step 310. At step 312 in the embodiment shown in FIG. 5, the fast energy storage device 120 is identified as being incapable of supplying energy because, for example, the fast energy storage device 120 has already discharged all energy contained therein to the DC bus 102.

Accordingly, at step 314, although the previously mentioned priority sequence prioritizes discharging fast energy storage devices (e.g., fast energy storage device 120) before slow energy storage devices (e.g., slow energy storage device 118), the slow energy storage device 118 will supply power to the DC bus 102, as shown by arrow 502, if the fast energy storage device 120 is incapable of supplying power. The DC load 108 continues to draw power from the DC bus 102, as indicated by arrow 504. The DC/DC converter 110A will continue to supply power to the DC bus 102, as indicated by arrow 506, provided that the power received from the renewable energy source 116 is not interrupted.

At block 304, once the DC UPS 104 determines that the DC UPS 104 is once again able to provide the necessary power to the DC bus 102 (in combination with the first DC/DC converter 110A) to maintain the voltage on the DC bus 102 at the desired level, the DC UPS 104 transmits a notification to each component of the system 100 that the DC UPS 104 is providing the necessary power to the DC bus 102 and the process 300 returns to block 306. Once the DC UPS is once again able to provide necessary power to the DC bus 102, any energy storage device that is not fully charged can also be recharged.

Figure 6:
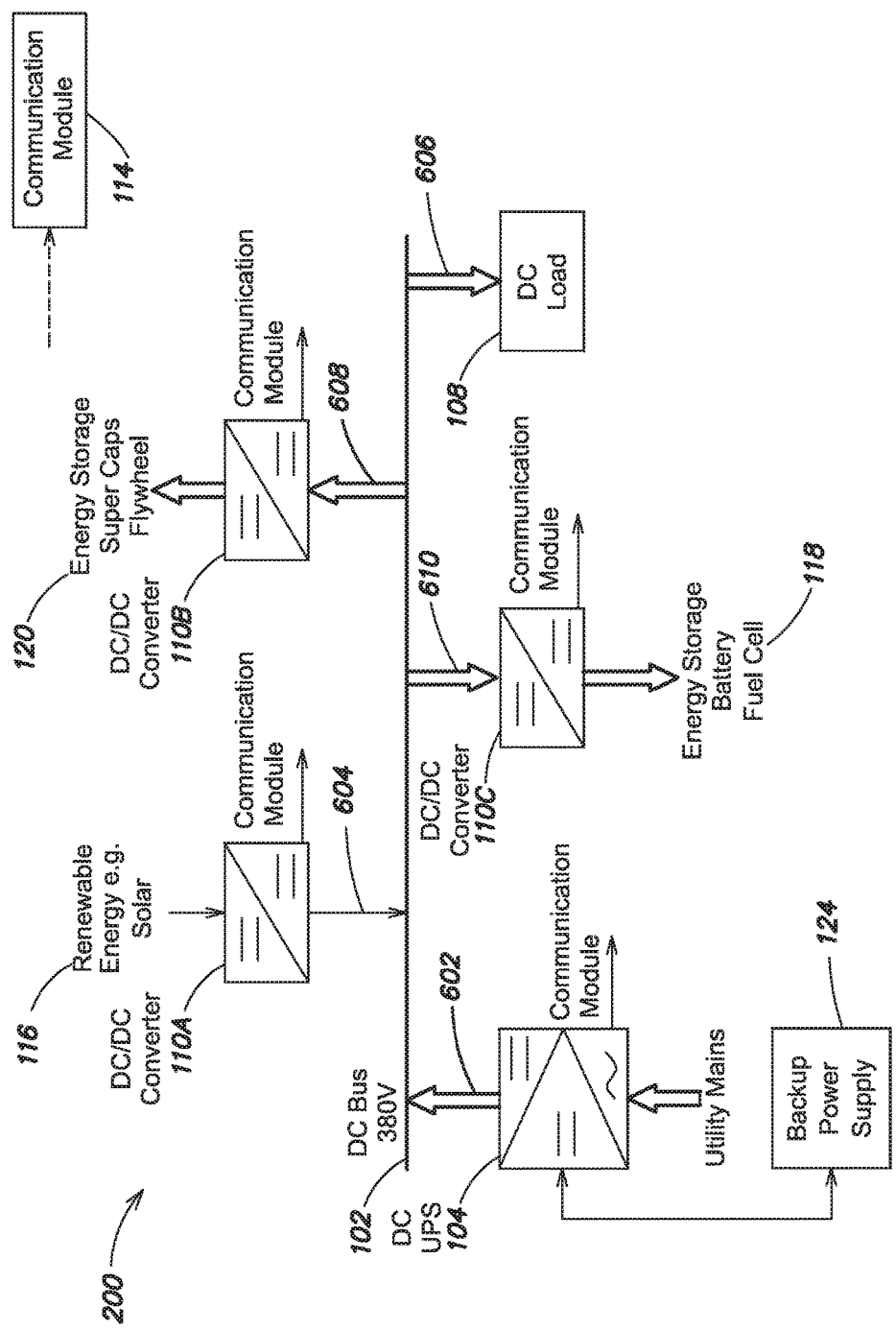
FIG. 6 is a block diagram of a decentralized module-based DC data center during a recovery condition according to one embodiment.

For example, FIG. 6 is a block diagram illustrating the portion 200 of the distributed power system 100 during a recovery condition. According to one embodiment, in the recovery condition the DC UPS 104 supplies sufficient power to the DC bus 102 (304 YES), but the fast energy storage device 120 and/or the slow energy storage device 118 have not fully charged (306 NO), for example, after a grid fault condition has occurred. Accordingly, during the recovery condition, the DC UPS 104 provides sufficient power (shown as arrow 602) to the DC bus 102 (in combination with the first DC/DC converter 110A) to power any DC loads 108 coupled to the DC bus and to provide necessary charging power to each energy storage device 118, 120 that is not fully charged. At block 308, sufficient DC power is drawn from the DC bus 102 by the second DC/DC converter 110B (e.g., shown as arrow 608) to charge the fast energy storage device 120 and by the third DC/DC converter 110C (e.g., shown as arrow 610) to charge the slow energy storage device 118. DC power is also drawn by the DC load 108 (e.g., shown as arrow 606). Each of the DC/DC converters 110B-C will continue to draw power from the DC bus 102 until the respective energy storage device connected thereto is fully recharged, resulting in the normal operating condition illustrated by FIG. 2.

As previously mentioned, FIG. 3 illustrates one embodiment of a process 300 for operating the system 100 where the components of the system are in active communication via the communication module 114. However, in other embodiments, communication via the communication module 114 may be interrupted, purposely omitted, or otherwise rendered inoperable. According to at least one embodiment, an alternate process is provided for operating the system 100 absent communication between components of the system 100.

Figure 7:
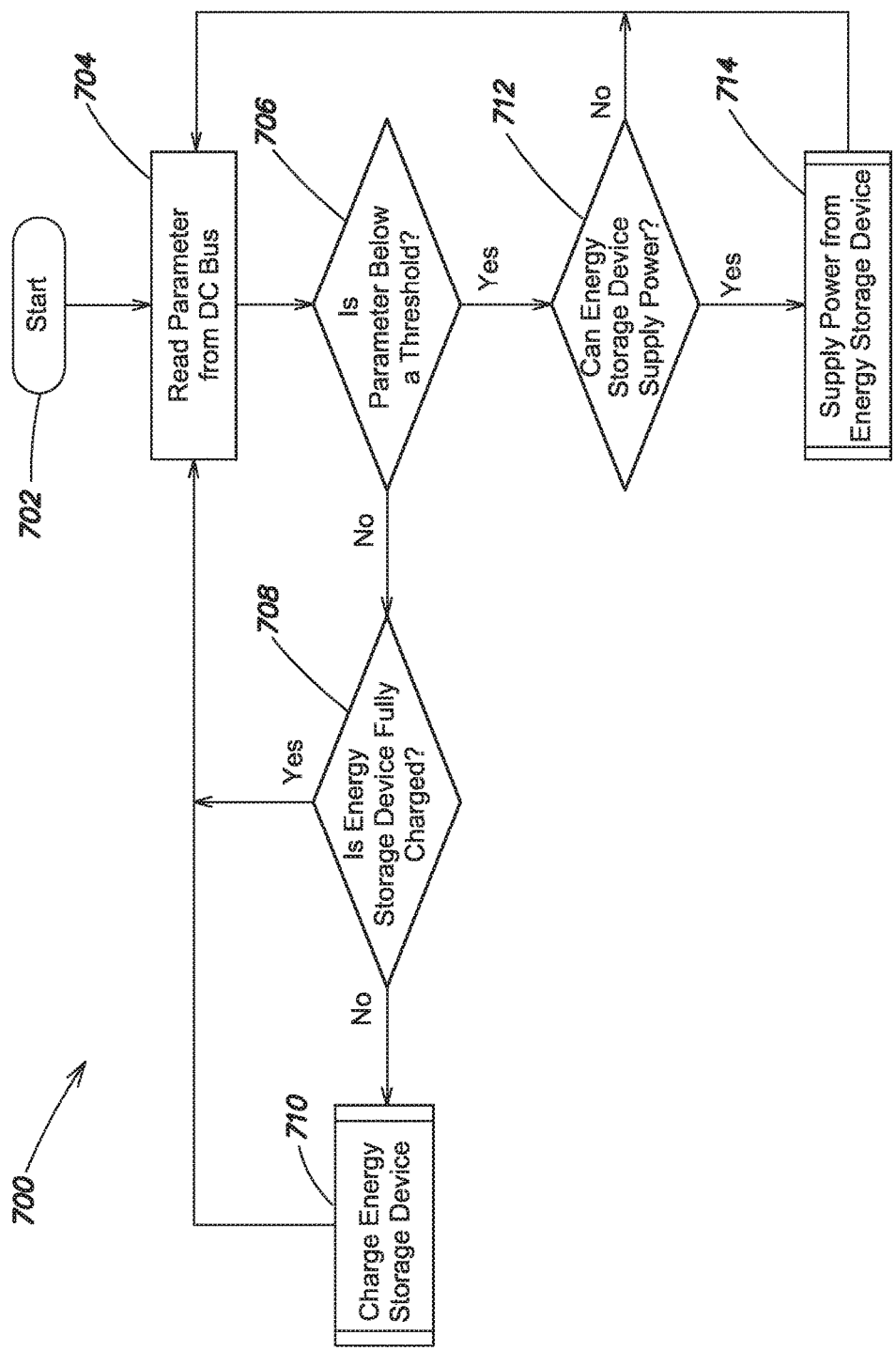
FIG. 7 is a process flow diagram illustrating a process for operating a DC/DC converter module according to one embodiment.

For example, FIG. 7 illustrates an example process flow 700 for operating an energy storage device during an emergency mode. According to one embodiment, an emergency mode is a condition wherein communication between components of the system 100 via the communication module 114 is impaired, unavailable, interrupted, temporarily or permanently omitted, etc. The process 700 described below may be implemented in any of the DC/DC converters 110B-C (coupled to any type of energy storage device, e.g., fast, slow, etc.) described above.

At block 702, DC power is provided to the DC bus 102 by the DC UPS 104 and the first DC/DC converter 110A. The DC UPS 104 and the first DC/DC converter 110A operate to maintain the voltage on the DC bus 102 at a nominal level (e.g., 380V).

At block 704, a DC/DC converter 110B-C coupled to an energy storage device 118, 120 reads a parameter (e.g., voltage, current, etc.) from the DC bus 102. At block 706, a determination is made by the DC/DC converter 110B-C as to whether the parameter is below a threshold. For example, the threshold may be a parameter value (e.g., 370 volts) that is below the nominal parameter value (e.g., 380 volts) associated with the DC bus 102. The threshold can be specified by, for example, a user, while in other embodiments the system may automatically calculate a threshold value.

Furthermore, the threshold can be different for different DC/DC converters. A DC/DC converter coupled to a first type of energy storage device (e.g., a fast discharge type energy storage device) may have a first threshold and a DC/DC converter coupled to a second type of energy storage device (e.g., a slow discharge type of energy storage device) may have a second threshold. For example, the second DC/DC converter 110B coupled to the fast energy storage device 120 may have a threshold value of 370V (e.g., indicative of a grid fault situation wherein the DC UPS 104 and the first DC/DC converter 110A are unable to maintain the voltage on the DC bus 102 at the nominal voltage of 380V), while the third DC/DC converter 110C coupled to the slow energy storage device 118 may have a threshold value of 360V (e.g., indicative of a grid fault situation wherein the second DC/DC converter 110B is unable to account for the deficiency of the DC UPS 104 and the first DC/DC converter 110A).

In response to a determination that the parameter value is not below the threshold, the process continues to block 708. At block 708, a determination is made by a DC/DC converter 110B-C as to whether the energy storage device (e.g., fast energy storage device 120, slow energy storage device 118, etc.) connected thereto is fully charged. In response to a determination that the energy storage device connected thereto is fully charged, the process returns to block 704. Otherwise, the process continues to block 710 whereby the uncharged energy storage device undergoes a charging process. To charge the energy storage device 118,120, the DC/DC converter 110B-C connected thereto operates to draw power from the DC bus 102 to which the DC/DC converter 110B-C is connected and supplies the power to the not-fully-charged energy storage device. The process then continues to block 704.

In response to a determination that the parameter value is below the threshold, the process continues to block 712. At block 712, a determination is made by the DC/DC converter 110B-C as to whether the energy storage device 118, 120 connected thereto is capable of supplying power to the DC bus 102 (e.g., whether the energy storage device has sufficient energy to supply power to the DC bus 102). In response to a determination that the energy storage device has enough energy to supply power to the DC bus, the process continues to block 714. Otherwise, the process continues to block 704. At block 714, the energy storage device 118,120 connected to the DC bus 102 via the DC/DC converter 110B-C supplies power to the DC bus 102. The process continues to block 704.

By monitoring a parameter of the DC bus 102 and providing DC power to the DC bus when the parameter is below a specific threshold corresponding to the type of energy storage device coupled thereto, each DC/DC converter can independently determine, absent communication with other components of the system 100, when the associated energy storage device should provide DC power to the DC bus 102 to maintain the DC voltage on the DC bus 102 at the desired level.

Figure 8:
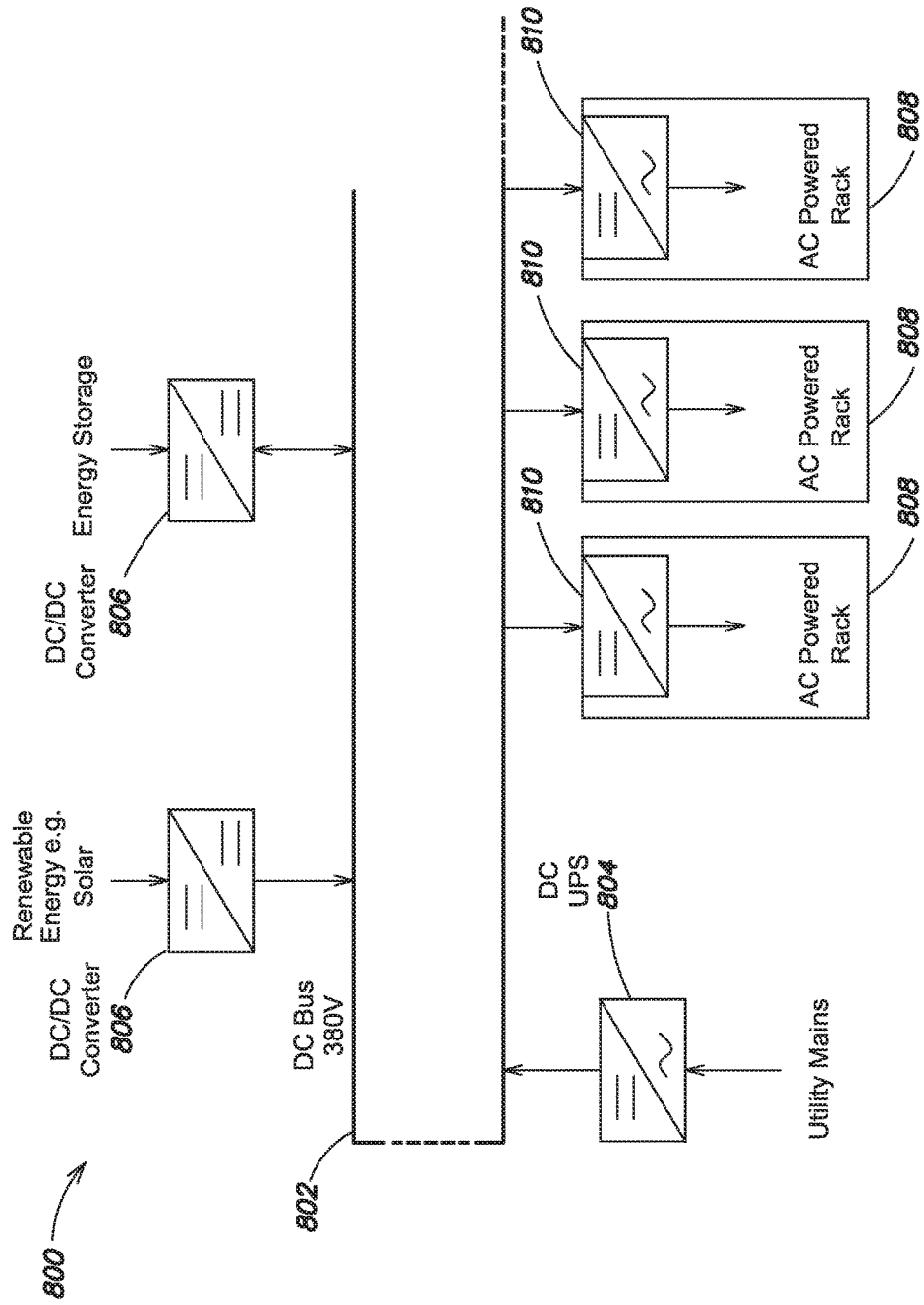
FIG. 8 is a block diagram of a decentralized module-based DC data center in accordance with aspects of the present invention.

FIG. 8 illustrates a block diagram of a distributed power system 800 according to one embodiment. The distributed power system 800 includes a DC bus 802, a DC UPS 804, one or more DC/DC converters 806, and one or more AC-powered loads 808 (e.g., one or more AC power racks). According to one embodiment, the DC bus 802 is coupled to each of the DC UPS 804, the one or more DC/DC converters 806, and the one or more AC-powered loads 808. Each of the one or more DC/DC converters 806 is coupled to a load (e.g., a DC-powered load), an energy source (e.g., a renewable energy source), and/or an energy storage device (e.g., a fuel cell, a battery, a fly wheel, a super capacitor, etc.). The DC UPS 804 is coupled to a utility mains power source and, in some examples, the DC bus 802 can be coupled to DC-powered loads, AC-powered loads, or a combination of DC- and AC-powered loads via one or more DC/DC converters.

In one embodiment, each of the one or more AC-powered loads 808 includes a DC/AC converter 810. Under normal operation the DC UPS 804 is operable to receive AC power from a utility mains power source, convert the AC power to DC power at a desired level, and supply the regulated DC power to the DC bus 802. The DC/AC converters 810 are operable to draw DC power from the DC bus 802, convert the DC power to AC power at a desired level, and supply the regulated AC power to the AC-powered loads to which the DC/AC converters 810 are coupled.

According to some embodiments, the DC/DC converters 806 are configured to operate as described above with respect to the DC/DC converters 110A-D shown in FIG. 1. For example, in situations wherein a DC/DC converter 806 is coupled to the DC bus 802 and a load (e.g., a DC-powered load), the DC/DC converter 806 is operable to draw DC power from the DC bus 802, convert the DC power to DC power at a desired level, and supply the regulated DC power to the load. In other examples, the DC/DC converter 806 can be coupled to the DC bus 802 and the renewable energy source 116 (e.g., a solar energy source, a hydroelectric energy source, etc.), and can draw DC power from the renewable energy source 116, convert the DC power to DC power at a desired level, and supply the regulated DC power to the DC bus 802. In yet other examples, the DC/DC converter 806 may be coupled to an energy storage device. Accordingly, the DC/DC converter 806 can be configured to draw power from the DC bus 802, supply power to the DC bus 802, and/or remain in an idle mode whereby the DC/DC converter 806 is not drawing power from, or supplying power to, the DC bus 802. For example, the DC/DC converter 806 is operable to receive DC power from the energy storage device, convert the DC power into DC power at a desired level, and provide the regulated DC power to the DC bus 802. The DC/DC converter 806 is also operable to receive DC power from the DC bus 802, convert the DC power into DC power at a desired level, and provide the regulated DC power to the energy storage device to recharge the device.

As described above, the system 100 includes a DC UPS 104 and a first DC/DC converter 110A (coupled to a renewable energy power source 116) that are configured to work together in a normal mode of operation to maintain the DC voltage on the DC bus 102 at a desired level. However, in at least one other embodiment, the system 100 does not include the first DC/DC converter 110A coupled to the renewable energy power source 116 and only the DC UPS 104 is configured to supply DC power to the DC bus 102 in the normal mode of operation.

As also described above, the system 100 includes a single DC UPS 104; however, in other embodiments, the system 100 may include any number of DC UPS's 104 that are configured, in a normal mode of operation, to receive AC power from an AC utility source, convert the AC power into DC power at a desired level, and provide the converted DC power to the DC bus 102.

As described above, the DC UPS's 104 are configured to provide power derived from either an AC power source or a backup power supply to the DC bus 102. However, in at least one embodiment, at least one DC UPS 104 is also configured to draw power from the DC bus 102 to power circuitry (e.g., a controller) within the UPS 104 (i.e., act as a load coupled to the DC bus 102).

As described above, the system 100 includes four DC/DC converters 110A-D; however, in other embodiments, the system 100 may include any number of DC/DC converters, each coupled to a corresponding energy source, energy storage device, or load. The system 100 may also include any number of DC/AC converters 106 and DC loads 108.

According to embodiments described herein, the DC bus 102 may be of any length and each component of the system 100 (e.g., the DC UPS 104, DC/DC converters 110A-D, DC/AC converter 106, DC load 108, etc.) can be connected to the DC bus 102 at any point along the length of the DC bus 102. For example, the first DC/DC converter 110A may be coupled to a point on the DC bus 102 that is adjacent the renewable energy source 116 while the third DC/DC converter 110C may be coupled to a point on the DC bus 102 that is adjacent the slow energy storage device 118.

Embodiments described herein provide a decentralized module-based DC data center including at least one DC UPS system configured to convert AC power from an AC power source into DC power and provide the DC power to a DC bus. The DC UPS systems of the decentralized module-based DC data center provide benefits that cannot typically be realized by AC UPS systems. In addition to generally being more efficient than AC UPS systems, the DC UPS systems can support the modular addition of additional DC components (e.g., energy storage devices or other energy sources) to the DC bus without requiring load balancing between phases. According to at least one embodiment, as it is not necessary for the DC UPS systems or DC components to account for the phase information of other components in the data center, the DC UPS systems and DC components can also provide full functionality even when communication between components is interrupted or missing.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A distributed power system comprising:
   a DC bus configured to be coupled to at least one first external DC load;
   at least one DC UPS having a first input configured to be coupled to an AC power source and to receive input AC power from the AC power source, a second input configured to be coupled to a backup power source and to receive backup DC power from the backup power source, and an output configured to be coupled to the DC bus, the at least one DC UPS configured to provide DC power to the DC bus derived from at least one of the input AC power and the backup DC power such that a DC voltage on the DC bus is maintained at a nominal level; and
   at least one power module configured to be coupled to an energy storage device and to the DC bus, to monitor the DC voltage on the DC bus, to convert DC power from the energy storage device into regulated DC power, and to provide the regulated DC power to the DC bus in response to a determination that the DC voltage on the DC bus is less than a threshold level,
   wherein in response to a determination that the DC voltage on the DC bus is greater than the threshold level, the at least one power module is further configured to convert DC power from the DC bus into regulated DC power, and to provide the regulated DC power to the energy storage device to charge the energy storage device; and
   wherein the at least one power module includes:
      a first power module configured to be coupled to a first type of energy storage device and to the DC bus, to monitor the DC voltage on the DC bus, to convert DC power from the first type of energy storage device into regulated DC power, and to provide the regulated DC power to the DC bus in response to a determination that the DC voltage on the DC bus is less than a first threshold level; and
      a second power module configured to be coupled to a second type of energy storage device and to the DC bus, to monitor the DC voltage on the DC bus, to convert DC power from the second type of energy storage device into regulated DC power, and to provide the regulated DC power to the DC bus in response to a determination that the DC voltage on the DC bus is less than a second threshold level.

2. The distributed power system of claim 1, further comprising a DC/DC converter configured to be coupled to a renewable energy power source, to receive DC power from the renewable energy power source, to convert the DC power from the renewable energy power source into regulated DC power, and to provide the regulated DC power derived from the renewable energy power source to the DC bus to maintain the DC voltage on the DC bus at the nominal level.

3. The distributed power system of claim 1, further comprising at least one DC/AC converter configured to be coupled to the DC bus and at least one AC load, to convert DC power from the DC bus into regulated AC power, and to provide the regulated AC power to the at least one AC load.

4. The distributed power system of claim 1, wherein the first threshold level is greater than the second threshold level.

5. The distributed power system of claim 4, wherein the first type of energy storage device is a fast discharge type of energy storage device, and wherein the second type of energy storage device is a slow discharge type of energy storage device.

6. The distributed power system of claim 5, wherein the first energy storage device is one of a capacitor and a flywheel.

7. The distributed power system of claim 5, wherein the second energy storage device is one of a battery and a fuel cell.

8. The distributed power system of claim 1, wherein the at least one power module is configured to operate absent communication with the at least one DC UPS.

9. The distributed power system of claim 1, further comprising a DC/DC converter configured to be coupled to a second external DC load, to receive DC power from the DC bus, to convert the DC power from the DC bus into regulated DC power, and to provide the regulated DC power derived from the DC bus to the second external DC load.

10. A method for controlling a DC data center, the method comprising acts of:
    receiving, by at least one DC UPS, input AC power from an AC power source;
    receiving, by the at least one DC UPS, backup DC power from a backup power source;
    providing, by the at least one DC UPS, DC power to a DC bus derived from at least one of the input AC power and the backup DC power such that a DC voltage on the DC bus is maintained at a nominal level;
    monitoring, by at least one power module coupled to at least one energy storage device, the DC voltage on the DC bus;
    converting, by the at least one power module in response to a determination that the DC voltage on the DC bus is less than a threshold level, DC power from the at least one energy storage device into regulated DC power;
    providing, by the at least one power module, the regulated DC power to the DC bus;

converting, by the at least one power module in response to a determination that the DC voltage on the DC bus is greater than the threshold level, DC power from the DC bus into regulated DC power; and providing, by the at least one power module, the regulated DC power to the energy storage device to charge the energy storage device;

wherein monitoring by the at least one power module includes monitoring, by a first power module coupled to a first type of energy storage device and a second power module coupled to a second type of energy storage device, the DC voltage on the DC bus;

wherein converting includes converting, by the first power module in response to a determination that the DC voltage on the DC bus is less than a first threshold level, DC power from the first type of energy storage device into first regulated DC power and converting, by the second power module in response to a determination that the DC voltage on the DC bus is less than a second threshold level, DC power from the second type of energy storage device into second regulated DC power; and wherein providing includes providing, by the first power module, the first regulated DC power to the DC bus in response to a determination that the DC voltage on the DC bus is less than the first threshold level and providing, by the second power module, the second regulated DC power to the DC bus in response to a determination that the DC voltage on the DC bus is less than the second threshold level.

11. The method of claim 10, further comprising acts of: converting, with at least one DC/AC converter coupled to the DC bus and at least one AC load, DC power from the DC bus into regulated AC power; and providing the regulated AC power to the at least one AC load.

12. The method of claim 10, further comprising acts of: converting, with at least one DC/DC converter coupled to the DC bus and a renewable energy source, DC power from the renewable energy source into regulated DC power; and providing the regulated DC power derived from the renewable energy power source to the DC bus to maintain the DC voltage on the DC bus at the threshold level.

13. The method of claim 10, further comprising acts of: converting, with at least one DC/DC converter coupled to the DC bus and at least one external DC load, DC power from the DC bus into regulated DC power; and providing the regulated DC power derived from the DC bus to the at least one external DC load.

14. The method of claim 10, further comprising an act of providing DC power from the DC bus to at least one external DC load.

15. The method of claim 10, wherein the acts of providing, by the at least one DC UPS, DC power to a DC bus, monitoring the DC voltage on the DC bus, converting, by the at least one power module, DC power from the at least one energy storage device into regulated DC power, and providing the regulated DC power to the DC bus, are performed absent communication between the at least one DC UPS and the at least one power module.

* * * * *